July 12, 1960 G. J. MUCHER ET AL 2,945,199
POTENTIOMETER
Filed Oct. 24, 1957 3 Sheets-Sheet 1
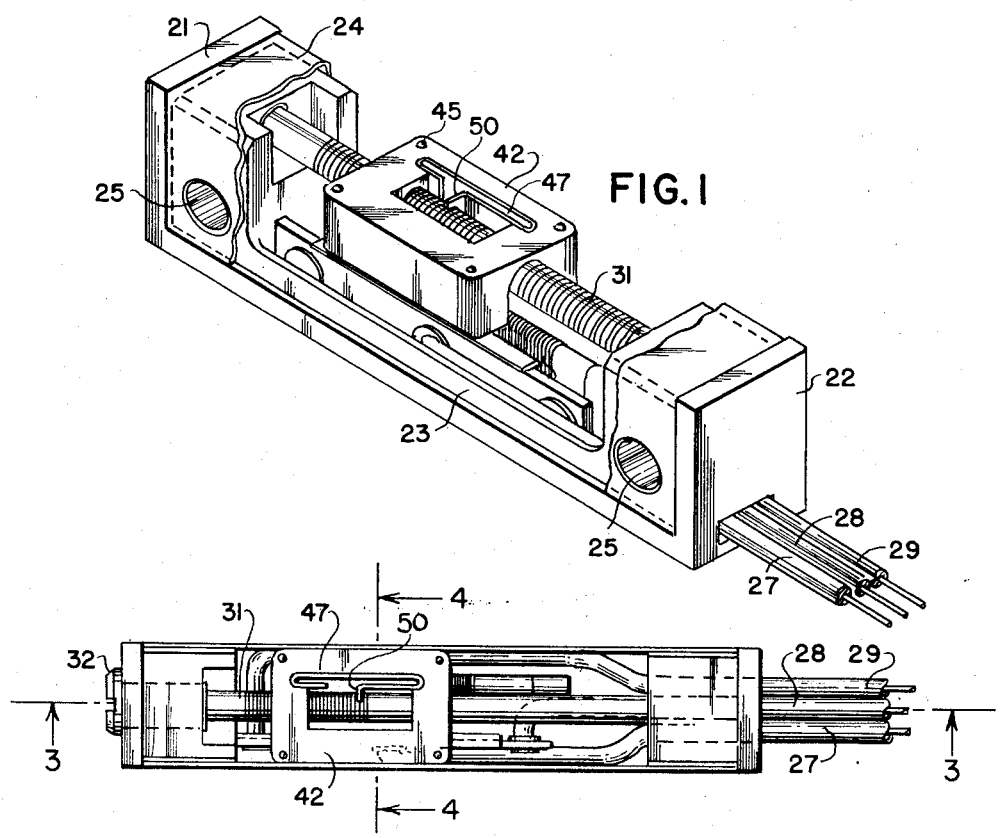
FIG. 1
FIG. 2
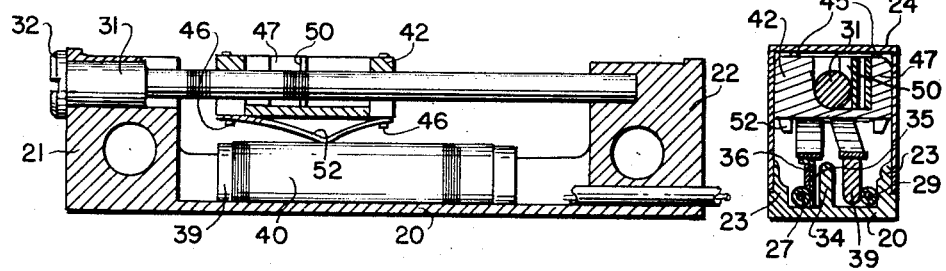
FIG. 3
FIG. 4
INVENTORS
George J. Mucher,
BY Salvatore N. Zarrillo
ATTORNEYS

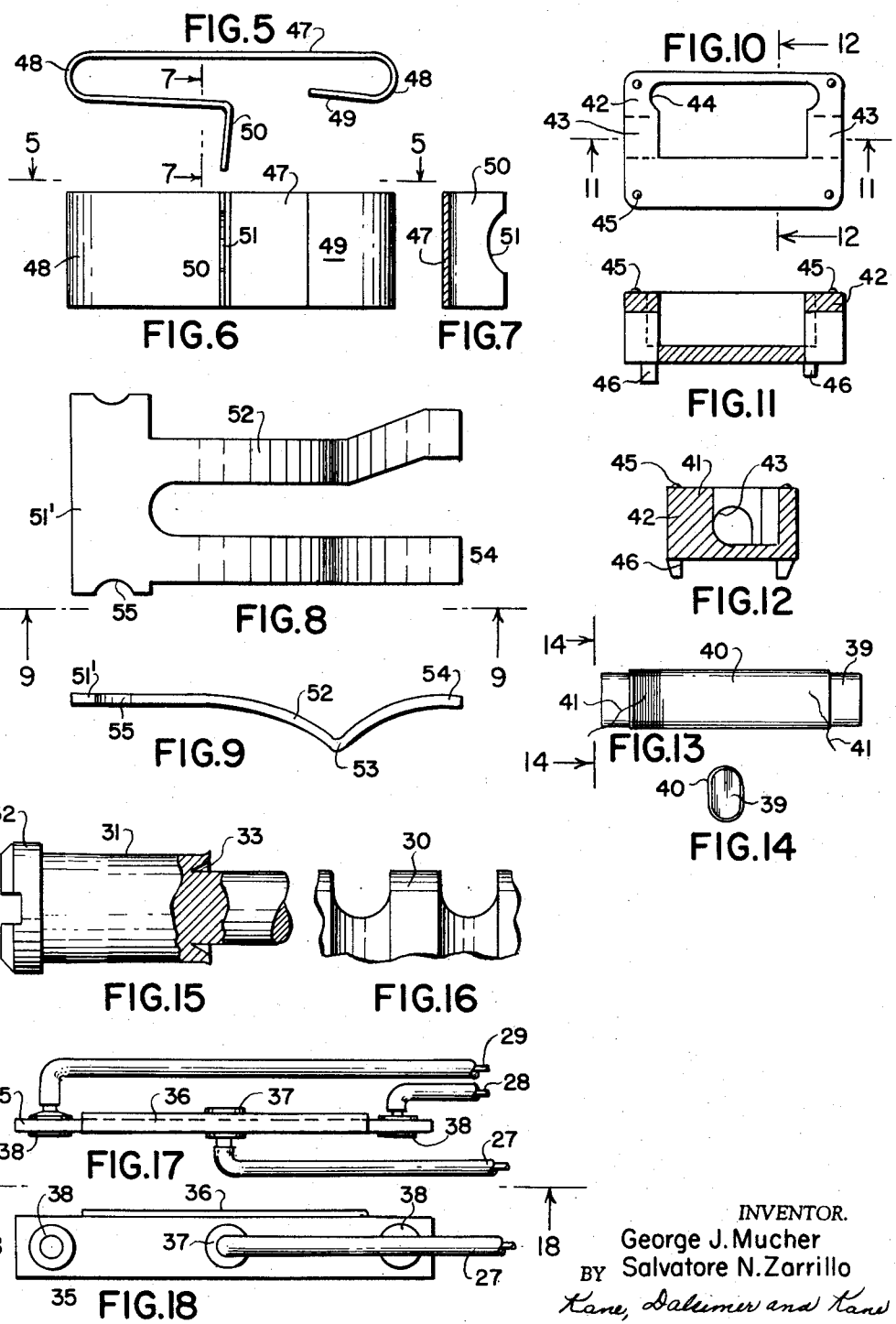

July 12, 1960
G. J. MUCHER ET AL
2,945,199
POTENTIOMETER
Filed Oct. 24, 1957
3 Sheets-Sheet 3
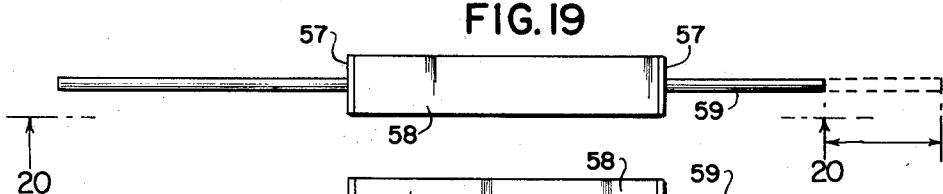
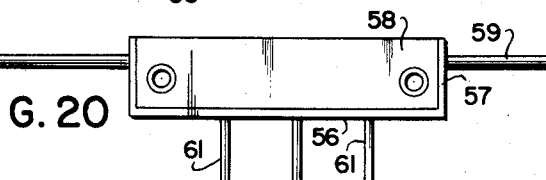
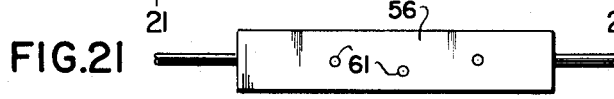
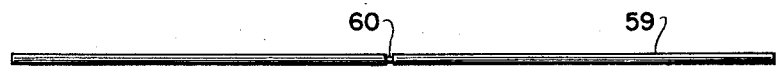
FIG.22
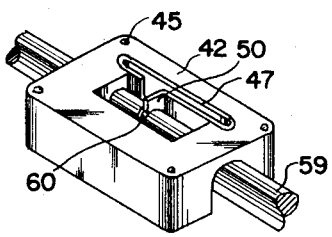
FIG.23
INVENTOR.
George J. Mucher
BY Salvatore N. Zarrillo
ATTORNEYS

United States Patent Office 2,945,199
Patented July 12, 1960

2,945,199

POTENTIOMETER

George J. Mucher, Strafford County, and Salvatore N. Zarrillo, Salmon Falls, N.H., assignors to Clarostat Mfg. Co., Inc., Dover, N.H., a corporation of New York Filed Oct. 24, 1957, Ser. No. 692,227

5 Claims. (Cl. 338—180)

This invention relates to a structurally and functionally improved potentiometer, and in its preferred aspects aims to provide a unit of this character which will be of the rectilinear type.

It is a primary object to furnish a unit which will include relatively few parts, each individually simple in construction and capable of ready manufacture; those parts being moreover susceptible of rapid assembly to furnish a unit of small dimensions, operating in an improved manner when included within an electrical circuit of a proper type.

Another object is that of providing a potentiometer of the precision type and of diminutive size which may be produced in large quantities at minimum expense.

Among other objects of the invention are those of furnishing a compact unit of improved design and rugged characteristics operating over long periods of time with freedom from all difficulties.

With these and other objects in mind, reference is had to the attached sheets of drawings illustrating practical embodiments of the invention and in which:

Fig. 1 is a perspective view of a potentiometer assembly with the cover broken away to disclose the interior structure;

Fig. 2 is a plan view thereof;

Fig. 3 is a sectional side view taken along the line 3—3 in the direction of the arrows as indicated in Fig. 2;

Fig. 4 is a transverse sectional view taken along the line 4—4 in the direction of the arrows as indicated in Fig. 2;

Fig. 5 is a plan view of a driving member or spring, taken along the line 5—5 in the direction of the arrows as indicated in Fig. 6;

Fig. 6 is a side elevation of that driving member;

Fig. 7 is a transverse sectional view taken along the line 7—7 in the direction of the arrows as indicated in Fig. 5;

Fig. 8 is a plan view of the contact unit or spring embodied in the assembly;

Fig. 9 is a side elevation taken along the line 9—9 in the direction of the arrows as indicated in Fig. 8;

Fig. 10 is a plan view of the contact carrier;

Fig. 11 is a sectional side view of the same taken along the line 11—11 in the direction of the arrows as indicated in Fig. 10;

Fig. 12 is a transverse sectional view taken along the line 12—12 in the direction of the arrows as indicated in Fig. 10;

Fig. 13 is a side elevation of a preferred form of resistance element embodied in the assembly;

Fig. 14 is an end view of the resistance element taken along the line 14—14 in the direction of the arrows as indicated in Fig. 13;

Fig. 15 is a fragmentary partly sectional side view of the operating end of the drive shaft;

Fig. 16 is a fragmentary side elevation of a detail of a preferred thread embodied in the shaft;

Fig. 17 is a plan view of the terminal board assembly;

Fig. 18 is a side elevation thereof taken along the line 18—18 in the direction of the arrows as indicated in Fig. 17;

Fig. 19 is a top plan view of a potentiometer embodying a structure alternative to that shown in the preceding views;

Fig. 20 is a side view of the unit as shown in Fig. 19;

Fig. 21 is a sectional bottom plan taken along the line 21—21 in the direction of the arrows as indicated in Fig. 20;

Fig. 22 shows in side elevation the shaft of the control of Fig. 19; and

Fig. 23 is a fragmentary perspective of the carrier and shaft of the latter unit.

Primarily referring to Figs. 1 to 4 inclusive, it will be seen that the potentiometer includes a base preferably of rectangular configuration and embracing a lower surface 20 from the opposite ends of which head portions 21 and 22 extend upwardly. Side flanges 23 intervene the end portions 21 and 22 and furnish between them a trough portion, while at the same time furnishing a mounting for a cover. The several parts of this base are preferably integral with each other and formed of a plastic having non-conducting properties. The inner zones of end portions 21 and 22 may be slightly reduced in height and thickness. Accordingly, a cover 24 may be accommodated by these portions and the flanges 23, so that the entire outer assembly will embody surface continuity.

The cover is retained against removal from the base by means of rivets in the form of mounting eyelets 25. The latter will extend through openings in the end portions 21 and 22 as well as through openings in the adjacent surfaces of the cover 24. End portion 21 will be formed with an axially extending opening throughout its entire length. An aligned recess is formed in the inner surface of end portion 22. These openings furnish surfaces for the rotatable accommodation of a shaft hereinafter described. Additionally, end portion 22 may be provided with an opening adjacent the lower surface 20 and through which leads 27, 28 and 29 extend.

A shaft extends longitudinally of the potentiometer and is spaced from the lower surface thereof. This shaft includes a threaded body 30 the end of which is accommodated within the recess of portion 22. Its opposite end terminates in a pair of enlarged portions having rotatable bearing with the surface of the opening extending through end portion 21. Beyond the outermost of these enlarged portions a head 32 is provided which has a diameter greater than that of the bore formed in end part 21. This head portion may be grooved so that the shaft can readily be turned by the use of a screwdriver or similar implement. While, of course, the threads formed in body portion 30 may embrace numerous different configurations, they are preferably of the detailed type illustrated especially in Fig. 16. Also, as shown in Fig. 15, the innermost enlarged portion 31 is preferably undercut as indicated at 33. Accordingly, the shaft being formed of metal, it will be feasible to extend the enlarged portion 31 adjacent the undercutting 33 outwardly in the form of a peened part. This may be continued to a degree where the resultant part extends at right angles to the shaft axis.

Extending parallel to the flanges 23 of the base member and throughout a central zone of their length is a further flange portion 34 as especially shown in Fig. 4. To one side of this central flange and between the same and the adjacent flange portion 23, a terminal board assembly is disposed. As particularly illustrated in Figs. 17 and 18, this assembly may include a dielectric strip 35 upon the upper edge of which a collector rail 36 of metal is mounted. That rail is L-shaped in section, with its arm overlying strip 35. It is conveniently secured to the strip by means of a rivet or eyelet 37 passing through aligned openings in these elements. This securing member may also serve as a terminal to which the end of lead 27 is secured. Similarly, and again conveniently by means of eyelets or rivets 38, the ends of leads 28 and 29 may be connected to opposite ends of the panel or board 35. The width of this assembly is such that it may be snugly accommodated within the space defined between ribs or flanges 23 and 34 to one side of the assembly.

Similarly accommodated to the opposite side of flange 34 is a resistance element. That element, as especially shown in Figs. 13 and 14, may include a body 39 formed of ceramic, glass, asbestos or other suitable material, which should preferably have high heat-conducting and dissipating characteristics. Upon this body there are disposed windings 40, although other types of resistance paths might be utilized. In any event, at suitable points in the resistance, leads 41 extend from the same. The width of this element is such that it may be accommodated between flange 34 and an adjacent spaced flange 23 in a position opposite that occupied by the terminal board assembly. So disposed, leads 41 may pass one beyond each of the ends of central flange 34 and be connected to leads 28 and 29 by conveniently attaching them to the securing elements 38.

Mounted upon shaft 30 for movement between end portions 21 and 22 is a contact carrier embracing a body 42, preferably of non-conducting plastic. This carrier, as especially shown in Figs. 10, 11 and 12, has a bore 43 of a diameter substantially larger than the threaded portions of shaft 31. Extending from its upper face, and preferably one adjacent each of the corners of its body, are rounded projections or protuberances 45. Similarly extending from its lower face are protuberances 46. As shown especially in Fig. 10, the central portion of body 42 may be recessed, and included in this recess 44 and preferably along one wall of the same is an enlarged area. The latter receives the body of a drive spring shown in detail in Figs. 5, 6 and 7.

In those views the numeral 47 indicates the major length of this spring, which corresponds to the major length of the recessed portion of the opening 44. The ends of the spring are turned upon themselves, as indicated at 48, to provide an inwardly projecting portion 49 and a corresponding but longer portion which terminates in a part or finger 50 extending substantially perpendicular to the axis of this spring when the latter is mounted by the carrier 42. The end part 50 is notched as at 51 along an arc corresponding to the radius of the base portions of the threads embodied in shaft 30. It is apparent that by proper manipulation, the spring body 47 may be disposed within the recess 44 with its end portions bearing against the rounded surfaces defined in the ends of the latter, and with the projecting portion 50 extending toward the axis of bore 43. So extending, and with the shaft lying within that bore, the edge of notch 51 will be engaged by the shaft threads.

A preferred form of contact is shown in Figs. 8 and 9. This contact includes a body 51' from which arms 52 extend. The latter are conveniently bent as at 53 to provide contact portions and terminate in ends 54. The opposite side edges of body 51' are preferably notched as at 55. The distance separating the ends 54 is equal to the distance separating the upper surfaces of contact rail 36 and resistance windings 40. It is apparent that as a result of the offset or indented contact portions 53, the outer ends 54 of fingers 52 will yieldingly and properly bear against the underside of the carrier 42. Body 51' and its associated parts being formed of spring material, that body may be disposed between a pair of the pins or protuberances 46 and flexed into position to be retained therebetween by having the edges of its notches 55 engage those projections. The second pair of protuberances will lie one adjacent each of the outer side edges of fingers 52 and thus prevent the latter from spreading.

As will be understood, in this form of apparatus a terminal board assembly, as shown, for example, in Figs. 17 and 18, is employed. It includes the contact rail 36. The leads 27, 28 and 29 are preferably extended through the opening formed in the end portion 22 of the base 20. That terminal board assembly is disposed within the groove formed on the face of the base between end portions 21 and 22 and to one side of the rib 34. The resistance 39 is disposed in the second groove formed on the face of the base and to the other side of rib 34. Both this resistance as well as the terminal board assembly may be secured in position by, for example, employing adhesive to cement them in their proper locations. So disposed, their upper edges will extend above rib 34. Lengths of weldable wire 41 extend between the ends of the resistance coil 40 and the terminals 38 of strip 35. These lengths function as subsidiary leads and in effect are extensions of the resistance winding. If desired, and as shown in Fig. 13, they may project from the body of the winding at selected points in the length of the latter. They may be spot welded to the winding and to the terminals 38.

The contact spring, as shown in Figs. 8 and 9, may now be mounted by the carrier. The latter may also receive the drive spring shown in Figs. 5, 6 and 7. Thereupon the carrier is disposed above the base and the end of shaft 31 inserted through the bore of end portion 21 to extend into the recess in end portion 22 and through the bore 43 of the carrier 42. With the parts thus disposed, the inner end surface of the enlarged portion of shaft 31 is peened outwardly as at 33 to engage the adjacent surface of end portion 21. Accordingly, the shaft will be maintained against axial displacement without it being necessary to employ any restraining assembly, such as a nut, washer or similar expedient.

Now, with the cover 24 mounted upon the base and secured in position, the inner face of that cover will be engaged by the protuberances 45 of carrier body 42 and thus maintain the latter against rocking movement and with minimum frictional drag. It is of course also apparent that the carrier will be restrained from rotating around the axis of shaft 31 by preferably engaging through its side faces against the adjacent inner side faces of the cover. Also, it will be limited in its travel by, for example, engaging the end portions 21 and 22.

By employing subsidiary leads 41 and properly connecting them, it is of course unnecessary to unwind the resistance to obtain, for example, a zero reading. The effective length of that resistance is determined by the wiper path limits as established by the contact travel. That contact, under rotation of the threaded shaft, will be effectively controlled. When the carrier engages one of the end portions of the base, or is otherwise prevented from further movement in one direction, the drive spring will simply ratchet or override the threads of the shaft as the latter continues to turn. It will be unnecessary to bore and thread the carrier. With the shaft spun or peened out, no play or axial movement of that shaft with respect to the base will occur. Therefore one is assured that objectionable end play will not occur. As the carrier moves back and forth along the base, a circuit will be established between the contact rail of the terminal board assembly and the resistance. The current-conducting leads being connected to establish the desired circuits as described, a proper potentiometer action will occur. It is of course apparent that many of the features traversed in Figs. 1 to 18 inclusive could be used to advantage in an electrical control having characteristics different from those of a potentiometer.

In Figs. 19 to 23 an alternative form of the apparatus has been shown, in which, instead of a screw-threaded shaft, a shaft is utilized which will have reciprocal motion by having, for example, one of its ends connected to a controlling mechanism. In those views the numeral 56 identifies a base corresponding to base 20 in the earlier views. Extending upwardly from the ends of the base are portions 57 against which a cover 58 may seat to provide a complete enclosure. A shaft 59 extends slidably through the assembly. That shaft, as in Fig. 22, may be formed with a reduced portion or groove 60.

Thus, as in Fig. 23, with the parts generally including an assembly such as that heretofore described, the carrier body 42 may mount the spring 47. The end portion 50 of the latter will be notched, preferably in the same manner as has been shown in Fig. 7. That end portion will rest within groove 60. Therefore as shaft 59 is reciprocated, the carrier 42 and the contact (not shown) carried thereby will be similarly moved. Accordingly they will traverse the resistance and contact rail or other electrical conducting surfaces included in the assembly. Also, in either form of the device, pins or rods 61 may extend from it to provide current-conducting leads. These will be especially useful if the device is to be mounted in terminal sockets, or if it is used in connection with a printed or similar circuit.

Thus, among others, the several objects of the invention as specifically aforenoted are achieved. Obviously numerous changes in construction and rearrangements of the parts may be restored to without departing from the spirit of the invention as defined by the claims.

We claim:

1. In a potentiometer of the type having a base formed of non-conducting material with upstanding end portions spaced from one another, a threaded shaft extending between said end portions and rotatably mounted thereby, a resistance element mounted on said base and disposed substantially parallel to said threaded shaft, a conducting element mounted on said base and disposed substantially parallel to said resistance element that improvement including, in combination, a contact carrier formed with openings therein encompassing said shaft, a conducting element mounted on said contact carrier and contacting said resistance element and said conducting element, a guiding member internally mounted in said contact carrier provided with a single engaging member on said guiding member having a width less than the distance between two threads of said threaded shaft and vertically disposed between said two threads, said guiding member further including spring means preventing movement of said single engaging member with respect to said contact carrier, said spring means being parallel to said threaded shaft and said guiding member further including means yieldingly urging said single engaging member perpendicularly toward said threaded shaft whereby longitudinal movement of said contact carrier is achieved as said threaded shaft is rotated and the single engaging member is free to move away from said threaded shaft to disengage therefrom when said contact carrier is prevented from longitudinal movement.

2. A potentiometer in accordance with claim 1 in which the contact carrier is formed of an electrically non-conductive substance whereby the threaded shaft is insulated from the remainder of the combination.

3. A potentiometer in accordance with claim 1 in which the engaging edge of the resilient member is formed with a radius substantially the same as the radius of the threaded shaft.

4. A potentiometer in accordance with claim 1 in which said guiding member is anchored to said contact carrier at curved ends thereof and said carrier is provided with slots to engage said ends in a glove fit.

5. In a potentiometer of the type having a base formed of non-conducting material with upstanding end portions spaced from one another, a threaded shaft extending between said end portions and rotatably mounted thereby, a resistance element mounted on said base and disposed substantially parallel to said threaded shaft, a conducting element mounted on said base and disposed substantially parallel to said resistance element that improvement including in combination a contact carrier formed of an electrically non-conductive material and with openings therein encompassing said shaft, a conducting element mounted on said contact carrier and contacting said resistance element and said conducting element, two vertically disposed facing slots formed in said contact carrier, a flat resilient spring member folded upon itself and forming two curved portions disposed within said slots in a glove fit, a section of said spring extending from one of said slots toward the other of said slots, a portion of said section perpendicular to said shaft, an edge of said portion engaging said shaft between threads whereby longitudinal movement of said contact carrier is achieved as said threaded shaft is rotated and the edge is free to disengage therefrom when said contact carrier is prevented from longitudinal movement.

References Cited in the file of this patent

UNITED STATES PATENTS

| | | |
|---|---|---|
| 2,306,152 | Batcheller | Dec. 22, 1942 |
| 2,668,218 | Searle | Feb. 2, 1954 |
| 2,706,230 | Bourns et al. | Apr. 12, 1955 |
| 2,777,926 | Bourns | Jan. 15, 1957 |
| 2,799,757 | Bourns et al. | July 16, 1957 |
| 2,831,949 | Bourns | Apr. 22, 1958 |

FOREIGN PATENTS

| | | |
|---|---|---|
| 645,898 | Great Britain | Nov. 8, 1950 |
| 759,398 | Great Britain | Oct. 17, 1956 |
| 1,115,354 | France | Apr. 23, 1956 |